United States Patent
Aromin et al.

[19]

[11] Patent Number: 6,122,155
[45] Date of Patent: *Sep. 19, 2000

[54] MINI APPLIANCE LEAKAGE CURRENT INTERRUPTER

[75] Inventors: Victor V. Aromin, West Warwick; Peter MacKay, Warwick, both of R.I.

[73] Assignee: Tower Manufacturing Corporation, Providence, R.I.

[*] Notice: This patent is subject to a terminal disclaimer.

[21] Appl. No.: 09/435,217

[22] Filed: Nov. 5, 1999

Related U.S. Application Data

[63] Continuation of application No. 09/379,961, Aug. 24, 1999, which is a continuation-in-part of application No. 08/837,739, Apr. 22, 1997, Pat. No. 5,943,199.

[51] Int. Cl.[7] .................................................... H02H 3/00
[52] U.S. Cl. ................................................. 361/42; 361/45
[58] Field of Search ......................................... 361/42, 45

[56] References Cited

U.S. PATENT DOCUMENTS 5,943,199  8/1999  Aromin ...................................... 361/42

*Primary Examiner*—Stephen W. Jackson
*Attorney, Agent, or Firm*—Kriegsman & Kriegsman

[57] ABSTRACT

A miniature appliance leakage current interrupter (ALCI) interrupts the flow of current through a pair of lines extending between a source of power and a load. The ALCI comprises a circuit breaker having a pair of normally closed switches, one switch being located in each of the pair of lines between the source of power and the load. The circuit breaker is connected to a relay circuit which selectively opens the pair of normally closed switches. The relay circuit is connected to a fault detection circuit which detects the presence of a ground fault condition in the pair of lines. When the ground fault condition detected exceeds a predetermined value, an integrated circuit chip in the fault detection circuit causes the relay circuit to open the circuit breaker. The ALCI further includes a housing having a top, a bottom, a front end and a rear end. A prong assembly for supplying power from the source of power to the remainder of the ALCI is in line mounted on the housing. In one embodiment of the present invention, the housing is permanently mounted on an electrical cord connected to the load and the prong assembly includes a line contact prong and a neutral contact prong. In another embodiment of the present invention, the housing is constructed so that it can be removably mounted on an electrical cord connected to the load and the prong assembly includes a line contact prong, a neutral contact prong and a ground contact prong.

11 Claims, 12 Drawing Sheets

MINI APPLIANCE LEAKAGE CURRENT INTERRUPTER

CROSS-REFERENCE TO RELATED APPLICATIONS

This application is a continuation of U.S. patent application Ser. No. 09/379,961, which was filed on Aug. 24, 1999 in the name of Victor V. Aromin, which, in turn, is a continuation-in-part of U.S. patent application Ser. No. 08/837,739, which was filed on Apr. 22, 1997 and which is now U.S. Pat. No. 5,943,199.

BACKGROUND OF THE INVENTION

The present invention relates generally to ground fault safety devices and more specifically to appliance leakage current interrupters.

It is well known for electrical appliances, such as hair dryers, to draw electrical power through connection to a power source, such as an electrical outlet. Specifically, the electrical appliance (which serves as the load of the electrical system) is connected to the power source by a pair of current-carrying wires. The pair of current-carrying wires typically include a hot wire and a neutral wire, the pair of wires having equal but opposite magnitudes under normal conditions.

On occasion, the electrical system may experience a ground fault condition while the load is connected to the power supply. A ground fault condition occurs when the differential between the values of the currents of the two wires exceeds a predetermined value. Often a ground fault will occur if the hot line becomes inadvertently grounded. A ground fault condition can result in a loss of power to the electrical appliance because current is unable to flow to the load. As a consequence, an excessive amount of current tends to flow into the ground conductor of the electrical system which, in turn, creates dangerous voltage levels at points in the circuit that should be at ground potential. This condition can result in potentially dangerous electrical shocks, which could seriously injure an individual.

Accordingly, ground fault safety devices are commonly employed in such electrical systems to eliminate ground fault conditions. One type of ground fault safety device is the ground fault circuit interrupter (GFCI). Another type of ground fault safety device is the appliance leakage current interrupter (ALCI). Ground fault circuit interrupters are used to eliminate ground fault conditions as well as grounded neutral conditions, whereas appliance leakage current interrupter are used only to eliminate ground fault conditions. Both types of ground fault safety devices prevent ground fault conditions from occurring by opening the electric circuit upon the detection of a ground fault condition in the pair of wires.

It is known to incorporate GFCI's and ALCI's into electrical plugs, electrical switches and electrical receptacles.

U.S. Pat. No. 5,177,657 to M. Baer et al. discloses of a ground fault interrupter circuit with an electronic latch. The ground fault interrupter circuit interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch circuit to latch in its second state upon detection of the fault condition.

One well known and commonly used ALCI is made by Tower Manufacturing Corporation and is shown U.S. Design Pat. No. 356,066 to C. P. Rao et al. This ALCI includes a fault detection circuit to detect the presence of a ground fault condition. The fault detection circuit includes a five layered transformer which monitors the current differential between the hot and neutral lines. The fault detection circuit also includes an integrated circuit (IC) chip which generates a output fault signal whenever the imbalance between the currents in the hot and neutral lines exceeds a predetermined value. The output fault signal is sent to a relay circuit which is coupled to a pair of switches, one switch being located in the hot line and one switch being located in the neutral line. When the magnitude of the output fault signal generated by the transformer exceeds a predetermined value, the IC chip applies power to the relay circuit which causes the pair of switches to open the hot and neutral lines. The IC chip used in the circuit is Raytheon Corporation chip number RV4145.

The circuit of the ALCI described above is commonly mounted within a generally rectangular housing having a top, a bottom, a front end and a rear end. The housing is attached to the appliance by an electrical cord which extends into the housing from the rear end. A pair of prongs (blades) typically extend out from the bottom of the housing and are sized, shaped and spaced away from each other so that they can be inserted into the sockets of an electrical outlet, thus making contact and closing the circuit.

The circuit components of the above identified ALCI are typically through-hole mounted on one side of a single-sided circuit board which is positioned within the housing and all the conductive connection lines and pads are soldered on the other side of the circuit board. In particular, it should be noted that the IC chip is mounted on the first side of the circuit board through plated-through hole technology.

In U.S. Pat. No. 5,198,955 to Wilner, there is disclosed a miniature circuit interrupter for interruption of a primary circuit, the circuit interrupter formed or molded with a plug, connector or the like, the plug or connector being non-serviceable and the circuit interrupter therein being sealed and watertight.

Another patent of interest is U.S. Pat. No. 4,567,544 to Ronemus et al.

SUMMARY OF THE INVENTION

It is an object of this invention to provide a new and improved ALCI.

It is another object of this invention to provide an ALCI as described above wherein the circuitry of the ALCI is contained within a generally rectangular housing which is very small in size.

It is yet another object of this invention to provide an ALCI as described above for use with an appliance such as a hair dryer.

It is still another object of this invention to provide an ALCI as described above wherein the ALCI is constructed so as to also serve as a plug for connecting the appliance to an electrical outlet.

It is another object of this invention to provide an ALCI as described above which has a limited number of parts, which is easy to use and which is inexpensive to manufacture.

Accordingly, there is provided an appliance leakage current interrupter (ALCI) for interrupting the flow of current through a pair of lines extending between a source of power and a load, said appliance leakage current interrupter comprising a housing comprising a top, a bottom, a front end and a rear end, a prong assembly for supplying power from the source of power to the remainder of said appliance leakage current interrupter, said prong assembly comprising first and second contact prongs which are in line mounted on said housing.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
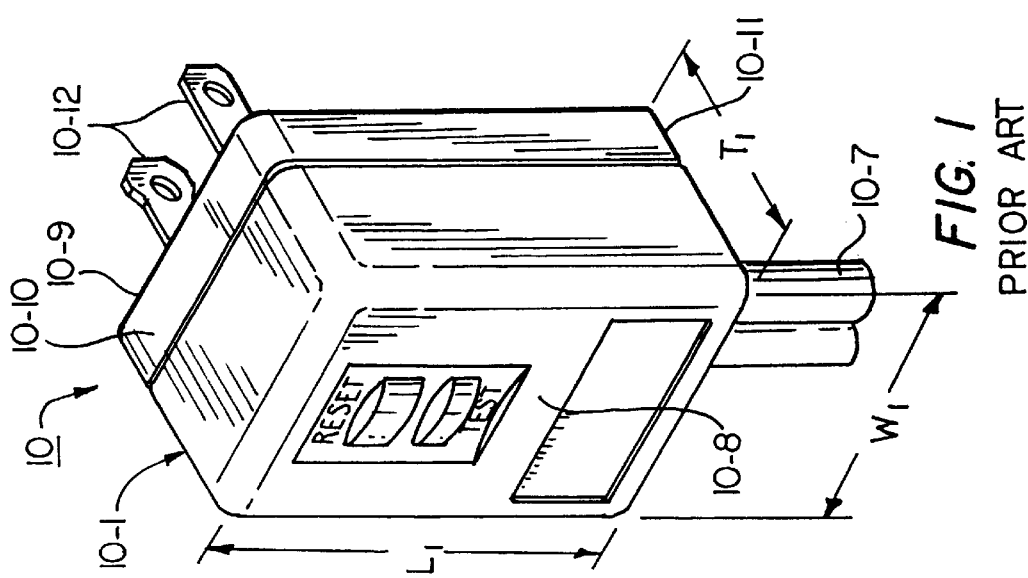
FIG. 1 is a perspective view of a prior art appliance leakage current interrupter.
Figure 2:
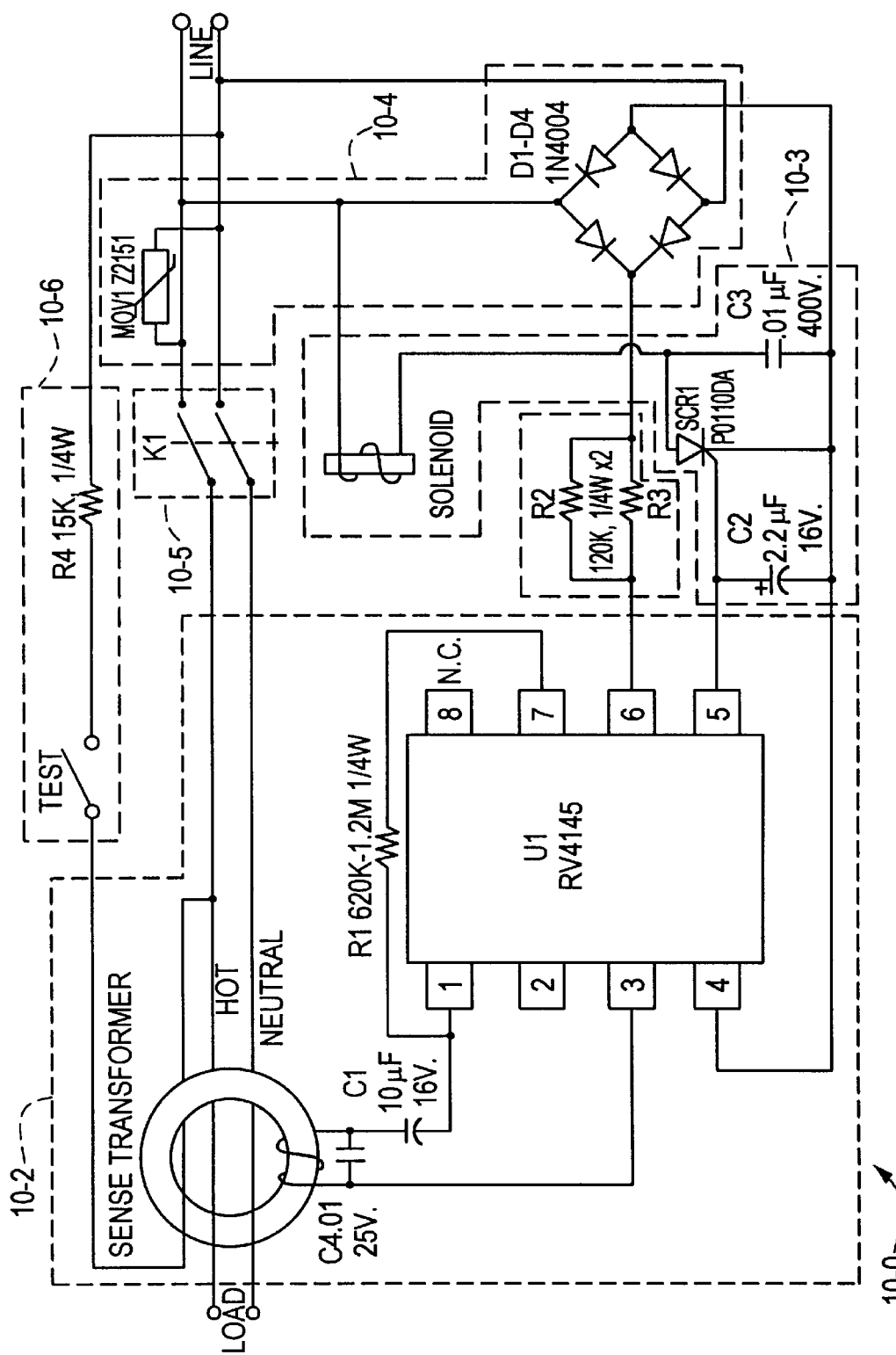
FIG. 2 is a circuit diagram of the prior art appliance leakage current interrupter shown in FIG. 1.
Figure 3:
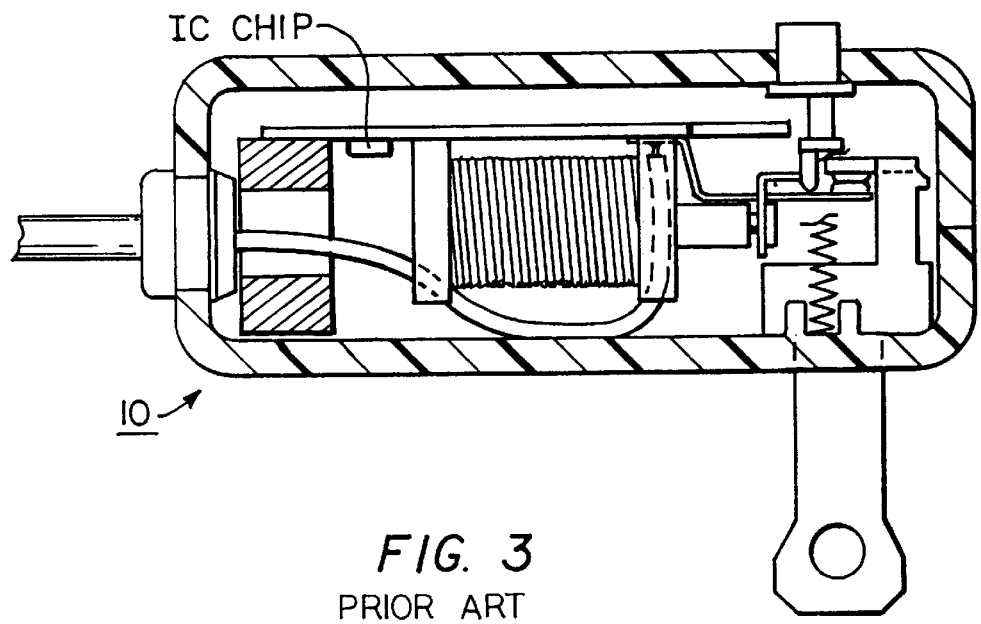
FIG. 3 is a side section view of the prior art appliance leakage current interrupter shown in FIG. 1.

FIGS. 1–3 show one type of prior art appliance leakage current interrupter (ALCI) which is well known in the art, the ALCI being identified by reference numeral 10. It is the function of ALCI 10 to detect and, if necessary, eliminate ground fault conditions. Appliance leakage current interrupter 10 is sold by Tower Manufacturing Corporation as model number SD1028, the design of which is represented in U.S. Design Pat. No. 356,066 which issued on Mar. 7, 1995 to C. P. Rao et al.

ALCI 10 comprises circuitry 10-0 which is mounted on a printed circuit board which, in turn, is disposed within a generally rectangular shaped housing 10-1.

Circuitry 10-0 includes a fault detection circuit 10-2, a relay circuit 10-3, a power supply circuit 10-4, a circuit breaker 10-5 and a test circuit 10-6, as shown in FIG. 2.

Housing 10-1 is permanently mounted onto an end of an electrical cord 10-7 which is connected to a load, such as an electrical appliance, and comprises a top 10-8, a bottom 10-9, a front end 10-10 and a rear end 10-11, as shown in FIG. 1. Housing 10-1 of ALCI 10 has a length $L_1$ of approximately 2.20 inches, a width $W_1$ of approximately 1.95 inches and a thickness $T_1$ of approximately 1.95 inches.

A pair of neutral contact prongs 10-12, also commonly referred to simply as prongs or blades, extend out from bottom 10-9 of housing 10-1 at about a 90 degree angle relative to the longitudinal axis of electrical cord 10-7, this particular orientation of prongs 10-12 in relation to housing 10-1 being commonly referred to as perpendicular mounting in the art. Prongs 10-2 are sized, shaped and spaced away from each other so that they can be inserted into the sockets of an electrical outlet, thus making contact and closing circuitry 10-0.

It should be noted that it would be desirable to additionally mount prongs 10-12 to extend out from front end 10-10 of housing 10-1 at about a 180 degree angle and in line with the longitudinal axis of electrical cord 10-7, this particular orientation of prongs 10-12 in relation to housing 10-1 being commonly referred to as in line mounting or straight blade mounting in the art. However, due to industry regulations, the particular size of housing 10-1 is deemed too large to safely accommodate electrical prongs which are in line mounted, thereby limiting potential applications. The particular details of ALCI 10 will be discussed below only as they compare to the present invention.

Figure 4:
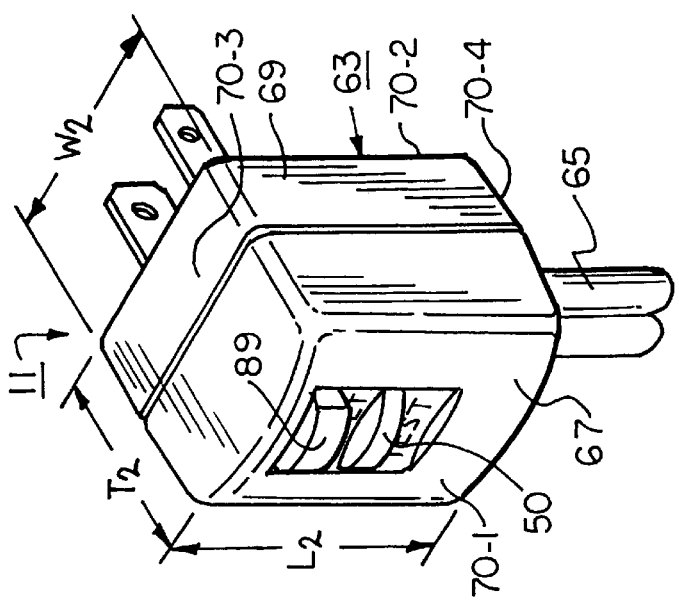
FIG. 4 is a perspective view of a first embodiment of a miniature appliance leakage current interrupter constructed in accordance with the principles of the present invention.
Figure 5:
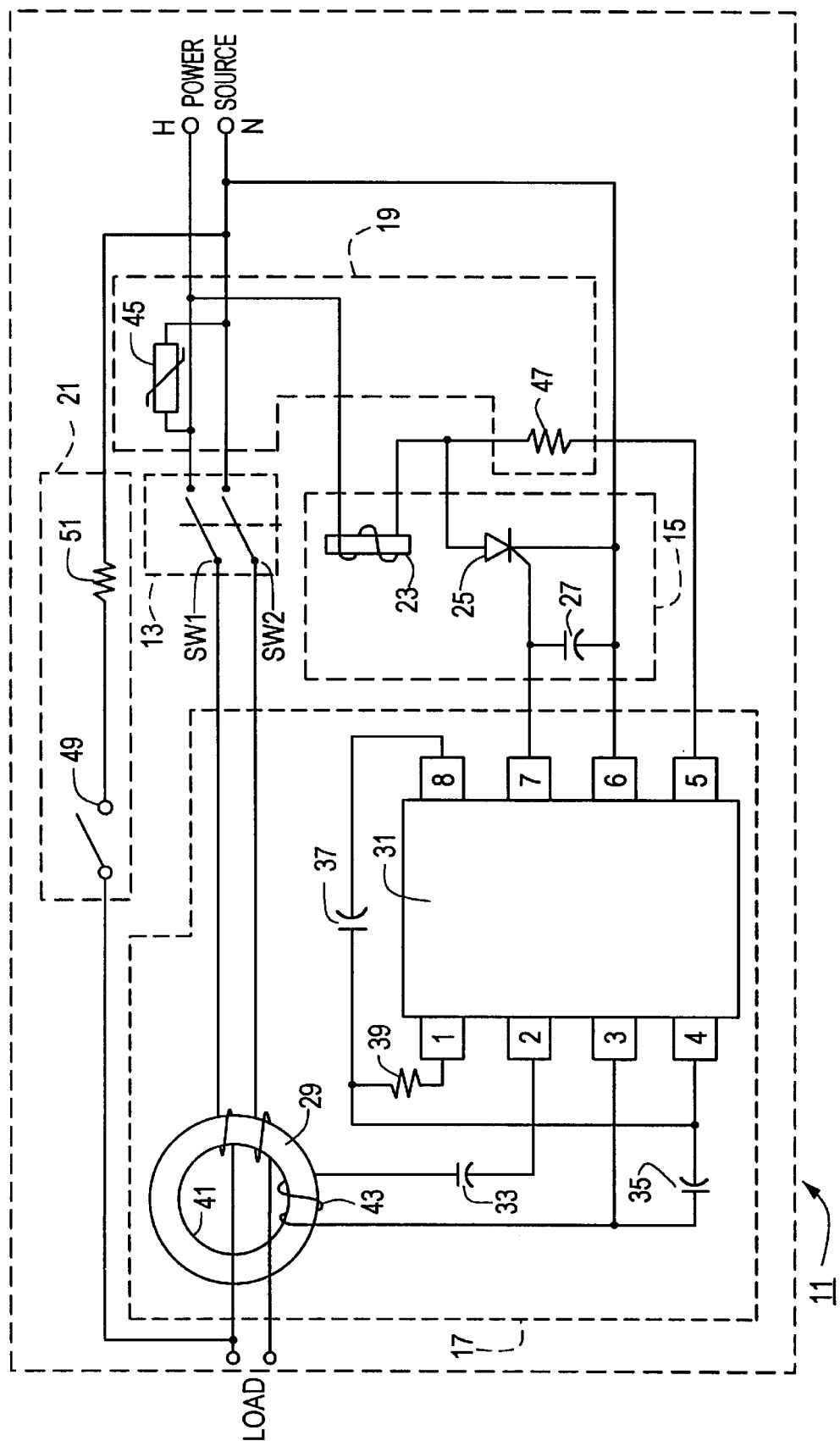
FIG. 5 is a circuit diagram of the miniature appliance leakage current interrupter shown in FIG. 4.

Referring now to FIGS. 4 through 8 and first to FIG. 5, there is shown a circuit diagram for a miniature appliance leakage current interrupter (ALCI) constructed in accordance with the principles of the present invention, the ALCI being designated as reference numeral 11. Appliance leakage current interrupter 11 includes a circuit breaker 13, a relay circuit 15, a fault detection circuit 17, a power supply circuit 19 and a test circuit 21.

Appliance leakage current interrupter 11 is electrically connected to the pair of current carrying wires which connect a load to a power source. The pair of current carrying wires include a hot line (or wire) H and a neutral line (or wire) N, lines H and N having equal but opposite magnitudes under normal conditions. It is the function of ALCI 11 to interrupt the flow of current through lines H and L upon detection of a ground fault condition, which will be discussed in detail below.

Circuit breaker 13 comprises a pair of normally closed switches SW1 and SW2 which are located in the hot and neutral lines, respectively, between the power source and the load. Switches SW1 and SW2 remain in the closed position until such time as fault detection circuit 17 detects the presence of a ground fault condition, at which time switches SW1 and SW2 open. Once open, switches SW1 and SW2 remain open until a reset button (to be discussed in detail below) is manually depressed to close the switches.

Relay circuit 15 comprises a solenoid 23, a silicon controlled rectifier (SCR) 25 and a capacitor 27. Solenoid 23 is connected to hot line H and serves the function of selectively opening switches SW1 and SW2 upon the detection of a ground fault condition. Rectifier 25 is connected to both solenoid 23 and fault detection circuit 17 and serves to energize solenoid 23 upon the detection of a ground fault condition. Rectifier 25 is preferably a model PO110DA rectifier sold by Tencor Corporation. Capacitor 27 is connected in parallel to rectifier 25 and fault detection circuit 17 and serves as a noise suppression filter. Capacitor 27 preferably has a value of 10 nf and acts to filter out noise occurring in circuit 11 which could mistakenly cause rectifier 25 to energize solenoid 23. It contrast to ALCI 11, ALCI 10 includes a pair of capacitors which are connected in parallel, the capacitors having values of 2.2 uf and 0.01 uf. Because the relay circuit of ALCI 11 includes one less capacitor than ALCI 10, ALCI 11 is able to be slightly reduced in size.

Fault detection circuit 17 comprises a transformer 29, an integrated circuit (IC) chip 31, a coupling capacitor 33, a noise filter capacitor 35, a timing capacitor 37 and a feedback resistor 39. It is the function of fault detection circuit 17 to detect the presence of a ground fault condition in the hot and neutral lines. Furthermore, upon the detection of a ground fault condition, fault detection circuit 17 generates an output signal which is applied to relay circuit 15 which opens circuit breaker 13.

Transformer 29 includes a laminated core 41 and a multiturn secondary sense winding 43. Laminated core 43 is generally ring shaped and includes three laminated layers or rings. In contrast, the laminated core of ALCI 10 includes five laminated layers; therefore, the transformer of ALCI 11 is substantially smaller than the transformer of ALCI 10. Hot wire H and neutral wire N serve as the primary winding and are wrapped around core 41 twice in order to build up the primary. In contrast, in ALCI 10, wires H and N are only wrapped around the core of the transformer once. Secondary winding 43 is connected to coupling capacitor 33 which, in turn is connected to pin 2 of IC chip 31. In addition, winding 43 is connected to pin 3 of chip 31 and noise filter capacitor 35 which, in turn, is connected to pin 4 of chip 31. It is the function of transformer 29 to sense current differentials between hot line H and neutral line N and induce an associated output to secondary winding 43. Coupling capacitor 33, which preferably has a value of 10 uf, serves to couple the AC signal of secondary winding 43 before the signal reaches chip 31. Noise filter capacitor 35, which preferably has a value of 0.1 uf, serves to filter out unwanted noise signals before such signals reach chip 31. Integrated circuit chip 31 is preferably an RV4140 model chip manufactured by Ratheon Corporation. In contrast, ALCI 10 uses IC chip model number RV4145, manufactured by Ratheon Corporation.

Pin 4 of chip 31 is connected to feedback resistor 39 which, in turn, is connected to pin 1 of chip 31. Pin 4 of chip 31 is also connected to timing capacitor 37 which, in turn, is connected to pin 8 of chip 31. Pins 6 and 7 of chip 31 are connected to capacitor 27 and rectifier 25. It is the function of ground fault interrupter IC chip 31 to amplify the ground fault signal generated by transformer 29 and provide an associated output signal at pin 7. Feedback resistor 39, which preferably has a value between 100 Kohms and 470 Kohms, serves to establish the minimum threshold value of a ground fault condition which will cause an output ground fault signal at pin 7 to pass to relay circuit 15. Timing capacitor 37, which preferably has a value of 0.02 uf, serves to work in conjunction with feedback resistor 39 in determining the minimum ground fault current setting.

Power supply circuit 19 comprises a metal oxide varistor 45 and a voltage dropping resistor 47. It is the function of power supply circuit 19 to supply the AC power produced from the power source to pin 5 (the power supply pin) of chip 31. Varistor 45, which preferably has a value of 150 volts, serves to provide voltage surge suppression for circuit 11 from the power source. Resistor 47, which preferably has a value of 82 Kohms, serves to supply the appropriate AC voltage required by IC chip 31. In contrast, ALCI 10 includes a rectifier bridge rather than a voltage dropping resistor. The elimination of the rectifier bridge enables the overall size of ALCI 11 to be slightly smaller than ALCI 10.

Test circuit 21 comprises a test switch 49 and a current limiting resistor 51. It is the function of test circuit 21 to provide a means for testing if appliance leakage current interrupter 11 is functioning properly. Test switch 49, which is preferably a normally open, single pole single throw switch, serves to energize the test circuit when in the closed position. Test switch 49 is opened and closed through the depression of a manually operated button 50. Resistor 51, which preferably has a value of 15 Kohms, serves to provide a simulated fault current to test circuit 21, similar to a fault condition which would be detected by fault detection circuit 17.

In use, appliance leakage current interrupter 11 detects ground fault conditions. Specifically, ground fault conditions result when the differential in the currents in the hot and neutral lines exceeds a predetermined value. For example, a ground fault condition may result from an accidental grounding of the hot line. Ground fault conditions can lead to excessive current flow which can cause dangerous voltages to be present at points that should be ground potential, which can be extremely dangerous. Fault detection circuit 17 detects the presence of a ground fault condition and generates a ground fault condition output signal which is applied to relay circuit 15. In turn, relay circuit 15 serves to open up circuit breaker 13 which opens circuit 11, thereby preventing further ground fault current to flow.

Figure 6:
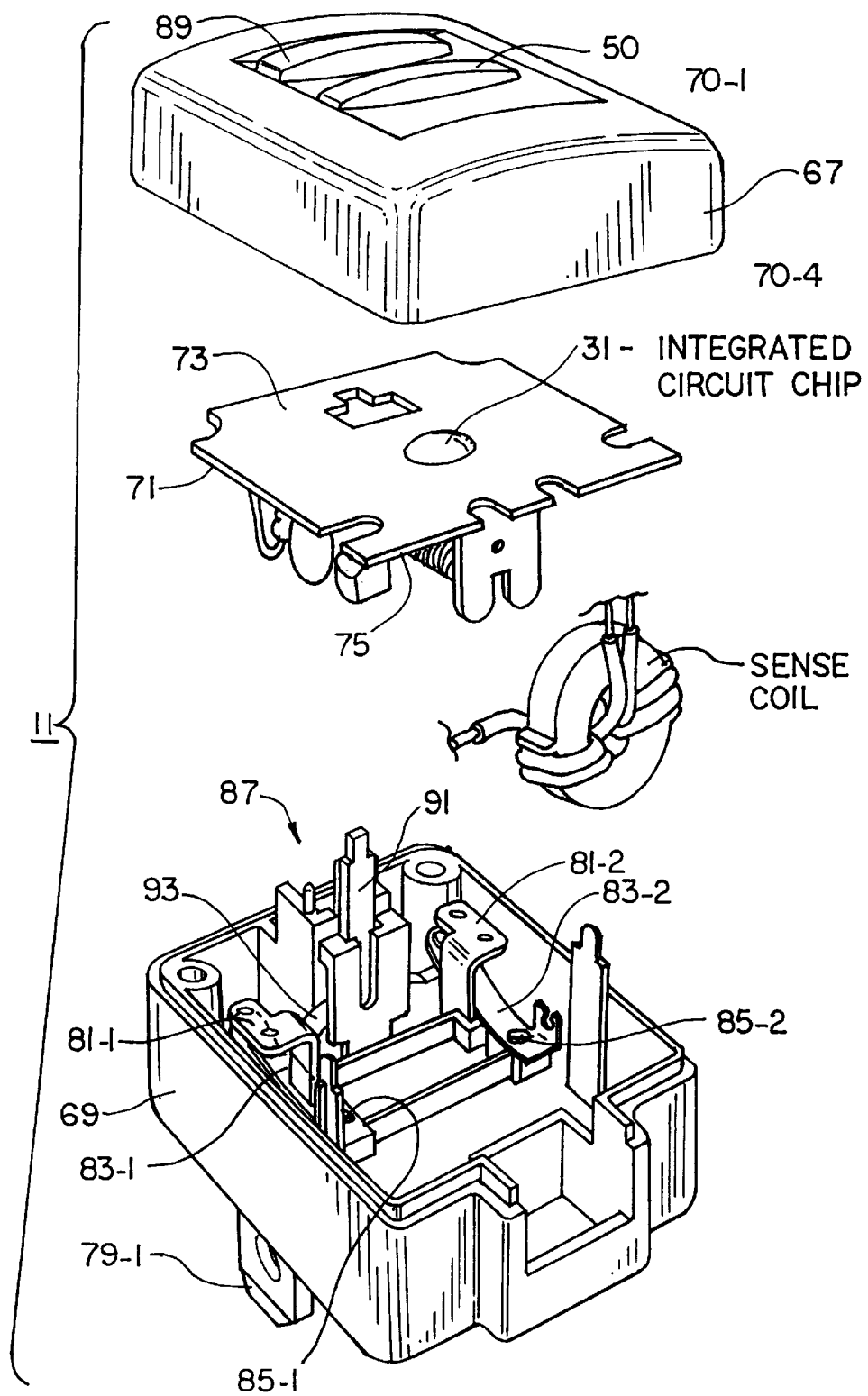
FIG. 6 is a top exploded view of the miniature appliance leakage current interrupter shown in FIG. 4.
Figure 7:
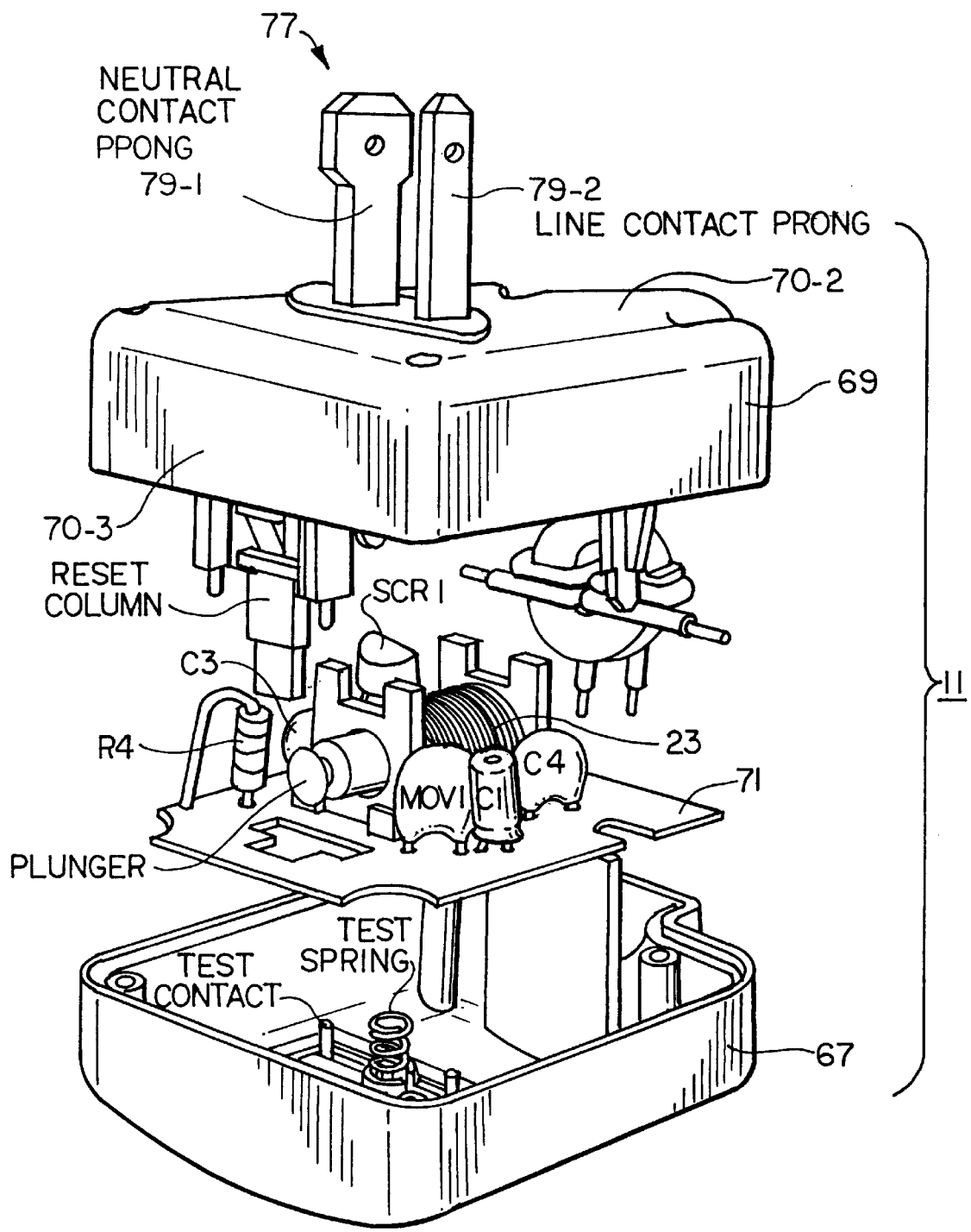
FIG. 7 is a bottom exploded view of the miniature appliance leakage current interrupter shown in FIG. 4.

As shown in FIGS. 4, 6 and 7, ALCI 11 further includes a rectangular-shaped housing 63 which is permanently mounted onto an end of an electrical cord 65 which is connected to the load, such as an electrical appliance. Housing 63 includes a top portion 67 and a bottom portion 69 which are secured together by screws (not shown). Housing 63 further includes a top 70-1, a bottom 70-2, a front end 70-3 and a rear end 70-4.

A single-side circuit board 71 is mounted within housing 63. The components of the electric circuit of ALCI 11 are mounted on circuit board 71 so as to facilitate the connection of the components and so as to reduce the overall size of the unit. Circuit board 71 comprises a top (i.e. solder) side 73 and a bottom side 75. The majority of the components of ALCI 11 are mounted on bottom side 75 and extend through plated-through holes in board 71. The components are then soldered and interconnected through conductive paths and patterns which are located on top side 73.

Figure 8:
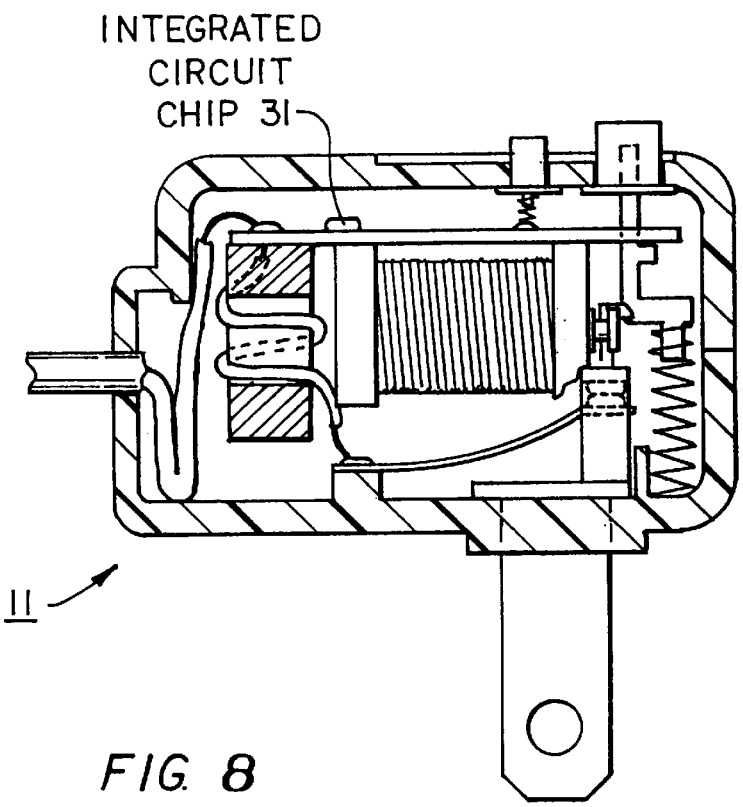
FIG. 8 is a side section view of the miniature appliance leakage current interrupter shown in FIG. 4.

It should be noted that IC chip 31 is mounted on top side 73 of circuit board 71. In contrast, in ALCI 10 the IC chip is mounted on the bottom side. By mounting IC chip 31 on top side 73, the density of components which are mountable on circuit board 71 is increased, thereby reducing the overall size of plug 61. Referring now to FIGS. 3 and 8, it can be seen that by placing of chip 31 on top side 73 rather than bottom side 75, transformer 29 and solenoid 23 are capable of being positioned closer to one another than in ALCI 10, thereby making ALCI 11 substantially shorter in length than ALCI 10. With the IC chip on the bottom side as in ALCI 10, the IC chip, the transformer and the solenoid must all be adequately spaced apart, which dramatically increases the overall length of the plug. It should also be noted that IC chip 31 is shown as being surface mounted on side 73. If desired, however, IC chip 31 could be mounted on side 73 of board 71 by wires and solder.

ALCI 11 also includes a prong assembly 77 for connecting the electrical components of ALCI 11 to a power supply. Referring to FIGS. 6 and 7, prong assembly 77 includes a neutral contract prong 79-1 and a line contact prong 79-2, prongs 79 being sized and shaped so as to be fitted within the sockets of an electrical outlet. Prongs 79 extend from within bottom portion 69 of housing 63 and protrude out through bottom 70-2 at an angle approximately 90 degrees relative to the longitudinal axis of electrical cord 65, the particular orientation of prongs 79 in relation to housing 63 being commonly referred to as perpendicular mounting in the art.

Neutral contact prong 79-1 is connected to an associated conductive bracket arm 81-1 which, in turn, is positioned above a conductive contact arm 83-1. Contact arm 83-1 is pivotally mounted within housing 63 about a pin 85-1 so as to selectively contact bracket arm 81-1.

Similarly, line contact prong 79-2 is connected to an associated conductive bracket arm 81-2 which, in turn, is positioned above a conductive contact arm 83-2. Contact arm 83-2 is pivotally mounted within housing about a pin 85-2 so as to selectively contact bracket arm 81-2.

Contact arms 81-1 and 81-2 are connected to the circuit of ALCI 11 and, as a consequence, when contact arms 83-1 and 83-2 are pivoted out of contact from bracket arms 81-1 and 81-2, respectively, power is not supplied ALCI 11.

ALCI 11 includes a reset assembly 87 which serves to reset ALCI 11 after the detection of a ground fault condition. Reset assembly 87 comprises a reset button 89, which like test button 50, extends out through top portion 67 of housing 63. Depression of reset knob 81 causes a springed reset column 91 to move downward. Downward movement of column 91 causes an actuator 93 to pivot each of contact arms 83 out of contact from its associated bracket arm 81. This creates an open connection in housing 63 which consequently prevents power from being supplied to ALCI 11. As soon as the reset button 89 is released, power is returned to ALCI 11 and circuit breaker 13 is closed.

As a result of the numerous changes made in ALCI 10 to presently form ALCI 11, the size of housing 63 of ALCI 11 has been considerably reduced. Specifically, housing 63 has a length $L_2$ of approximately 1.5 inches, a width $W_2$ of approximately 1.35 inches and a thickness $T_2$ of approximately 1.05 inches.

As can be appreciated, ALCI 11 as so constructed, also serves as a plug which can be connected to an electrical outlet.

Figure 9:
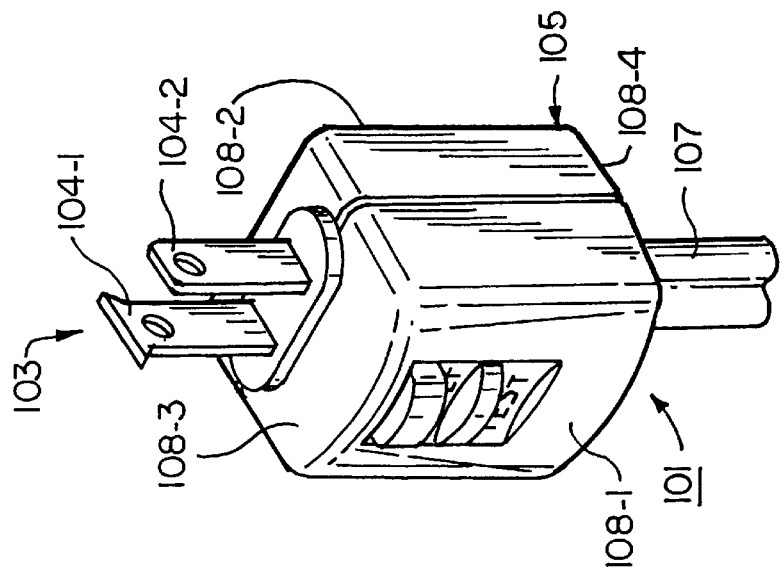
FIG. 9 is a perspective view of a second embodiment of a miniature appliance leakage current interrupter.
Figure 10:
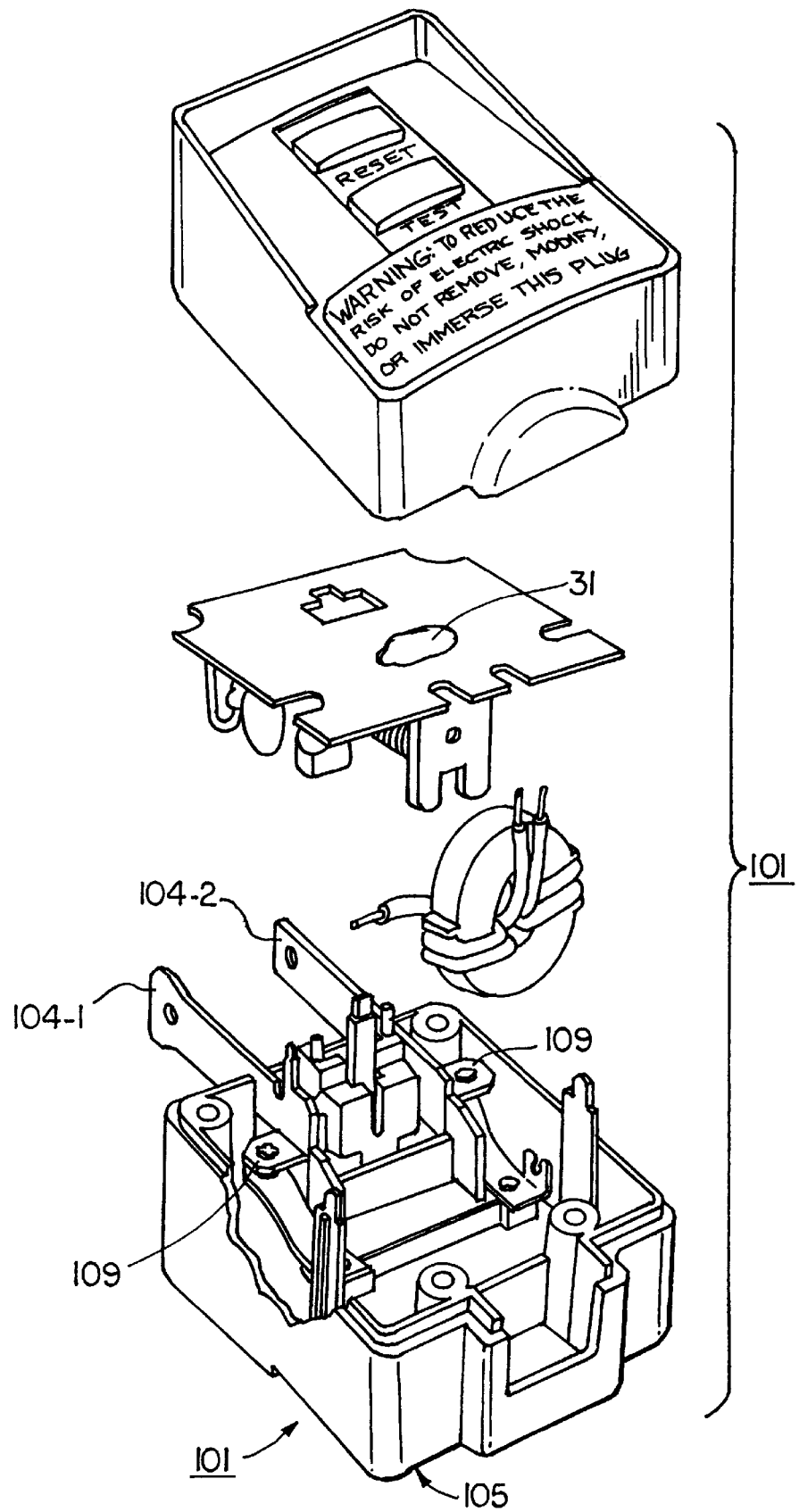
FIG. 10 is a top exploded view of the miniature appliance leakage current interrupter shown in FIG. 9.
Figure 11:
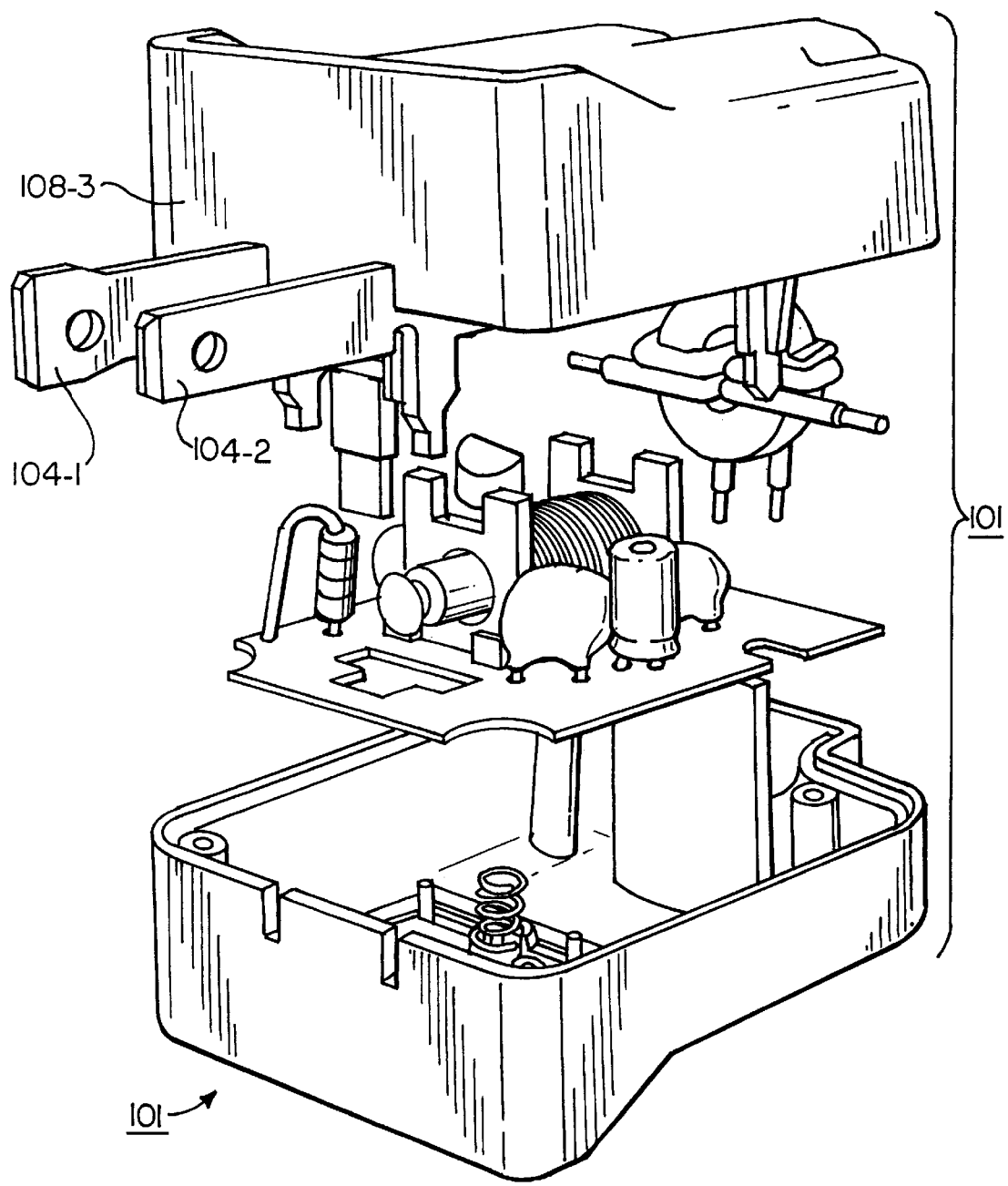
FIG. 11 is a bottom exploded view of the miniature appliance leakage current interrupter shown in FIG. 9.

Referring to FIGS. 9–11, there is shown a second embodiment of an appliance leakage current interrupter constructed in accordance with the principles of the present invention, the ALCI being designated as reference numeral 101. It should be noted that ALCI 101 comprises the same principal circuit components as the circuitry of ALCI 11. Namely, ALCI 101 similarly comprises circuit breaker 13, relay circuit 15, fault detection circuit 17, power supply circuit 19 and a test circuit 21.

The principal distinction between ALCI 101 and ALCI 11 is that prongs 79 in ALCI 11 are perpendicularly mounted whereas prongs 103 in ALCI 101 are in line, or straight blade, mounted, as will be described in detail below.

Specifically, ALCI 101 comprises a rectangular-shaped housing 105 which is permanently mounted onto an end of an electrical cord 107 which is connected to the load, such as an electrical appliance. Housing 105 comprises a top 108-1, a bottom 108-2, a front end 108-3 and a rear end 108-4, as shown in FIG. 9.

ALCI 101 further includes a prong assembly 103 which comprises a neutral contact prong 104-1 and a line contact prong 104-2 which are sized and shaped so as to be fitted within the sockets of an electrical outlet. Prongs 104 extend from within housing 105 and protrude out through front end 108-3 from housing 105 at an angle of 180 degrees relative to the longitudinal axis of electrical cord 107.

It should be noted that the size and shape of a pair of bracket arms 109 are slightly different than bracket arms 81 in ALCI 11 in order to accommodate the change in the position of prongs 103 relative to housing 105. Otherwise, the remaining components of ALCI 101 are similar in size, shape and function with the remaining components of ALCI 11.

It should also be noted that the considerable reduction in the size of housing 105 in comparison with housing 10-1 of prior art ACLI 10 enables ALCI 101 to be safely constructed with prongs 104 extending out at an angle of 180 degrees from the longitudinal axis of cord 107, which is a principal object of the present invention.

Referring to FIGS. 12–16, there is shown a third embodiment of an appliance leakage current interrupter constructed in accordance with the principles of the present invention, the ALCI being designated as reference numeral 201.

Figure 14:
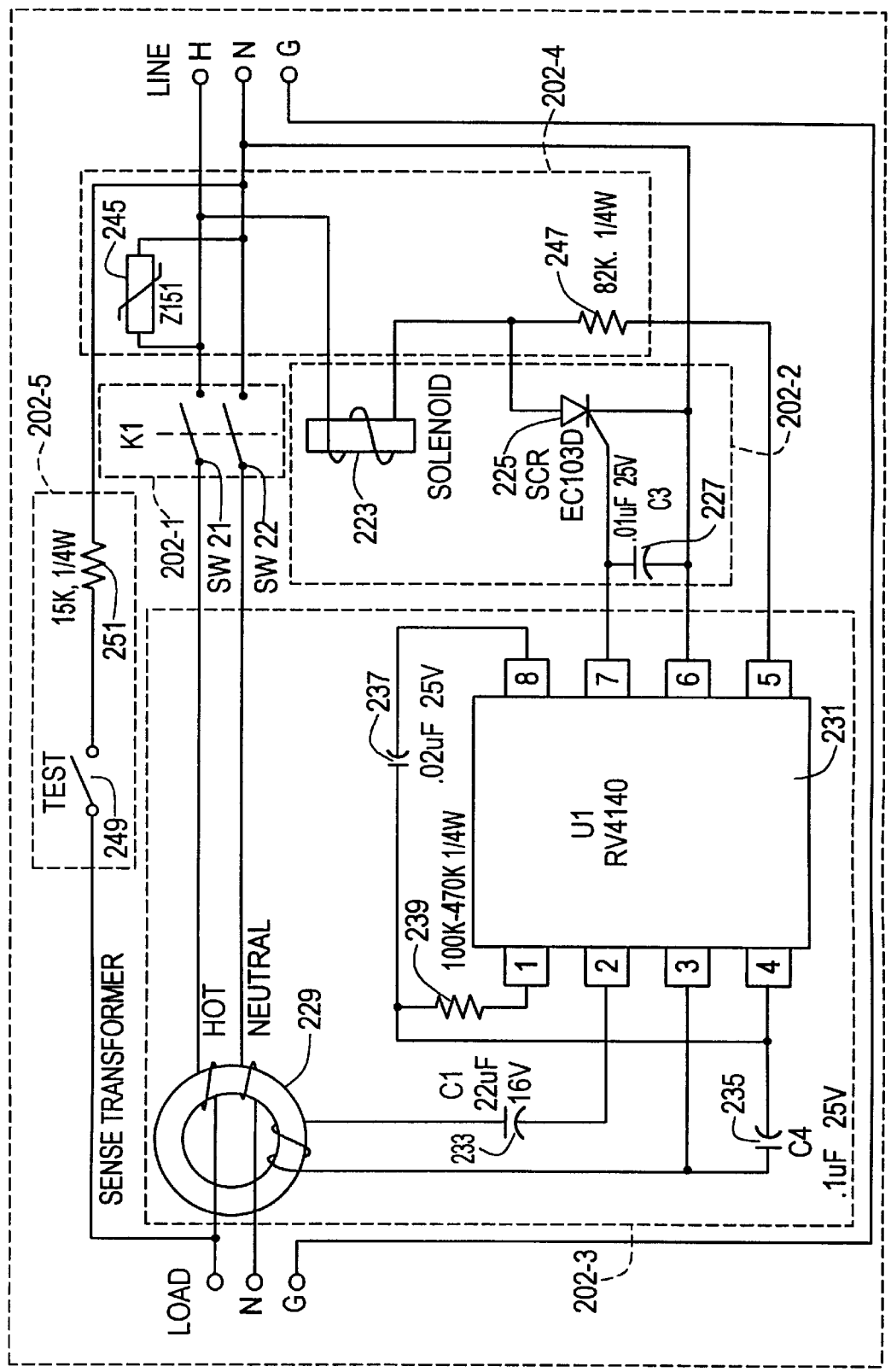
FIG. 14 is a circuit diagram of the miniature appliance leakage current interrupter shown in FIG. 12.

As shown in FIG. 14, ALCI 201 comprises many of the same principal circuit components as the circuitry of ALCI 101. Namely, ALCI 201 similarly comprises a circuit breaker 202-1, a relay circuit 202-2, a fault detection circuit 202-3, a power supply circuit 202-4 and a test circuit 202-5. ALCI 201 is electrically connected to three wires which connect a load to a power source. The three wires include a hot line (or wire) H, a neutral line (or wire) N and a ground line (or wire) G. Hot line H and neutral line N have equal but opposite magnitudes under normal conditions. It is the function of ALCI 201 to interrupt the flow of current through lines H and L upon detection of a ground fault condition.

Circuit breaker 202-1 comprises a pair of normally closed switches SW21 and SW22 which are identical to switches SW1 and SW2 in circuit breaker 13.

Relay circuit 202-2 comprises a solenoid 223, a silicon controlled rectifier (SCR) 225 and a capacitor 227. Relay circuit 202-2 differs from relay circuit 15 only in the values of rectifier 225 and capacitor 227. Specifically, rectifier 225 is preferably a model EC103D rectifier and capacitor 227 preferably has a value of 0.01 uF.

Fault detection circuit 202-3 includes electronic components which are identical in electrical connection and function with the electronic components of fault detection circuit 17. Specifically, fault detection circuit 202-3 comprises a transformer 229, an integrated circuit (IC) chip 231 preferably having the model number RV4140, a coupling capacitor 233 preferably having a value of 22 uF, a noise filter capacitor 235 preferably having a value of 0.1 uF, a timing capacitor 237 preferably having a value of 0.02 uF and a feedback resistor 239 preferably having a value in the range from 100 Kohms to 470 Kohms.

Power supply circuit 202-4 comprises a metal oxide varistor 245 and a voltage dropping resistor 247 which are identical to varistor 45 and resistor 47 in power supply circuit 19.

Test circuit 202-5 comprises a test switch 249 and a current limiting resistor 251 which are identical to test switch 49 and 51 in test circuit 21.

It should be noted that there are two principal distinctions between ALCI 201 and ALCII 101.

As a first principal distinction, ALCI 101 comprises two prongs 104 whereas ALCI 201 comprises three prongs 204. As a second principal distinction, ACLI 101 is permanently mounted on electrical cord 65 whereas ALCI 201 is constructed so that it can be removably mounted on an electrical cord 207, as will also be described in further detail below.

Figure 12:
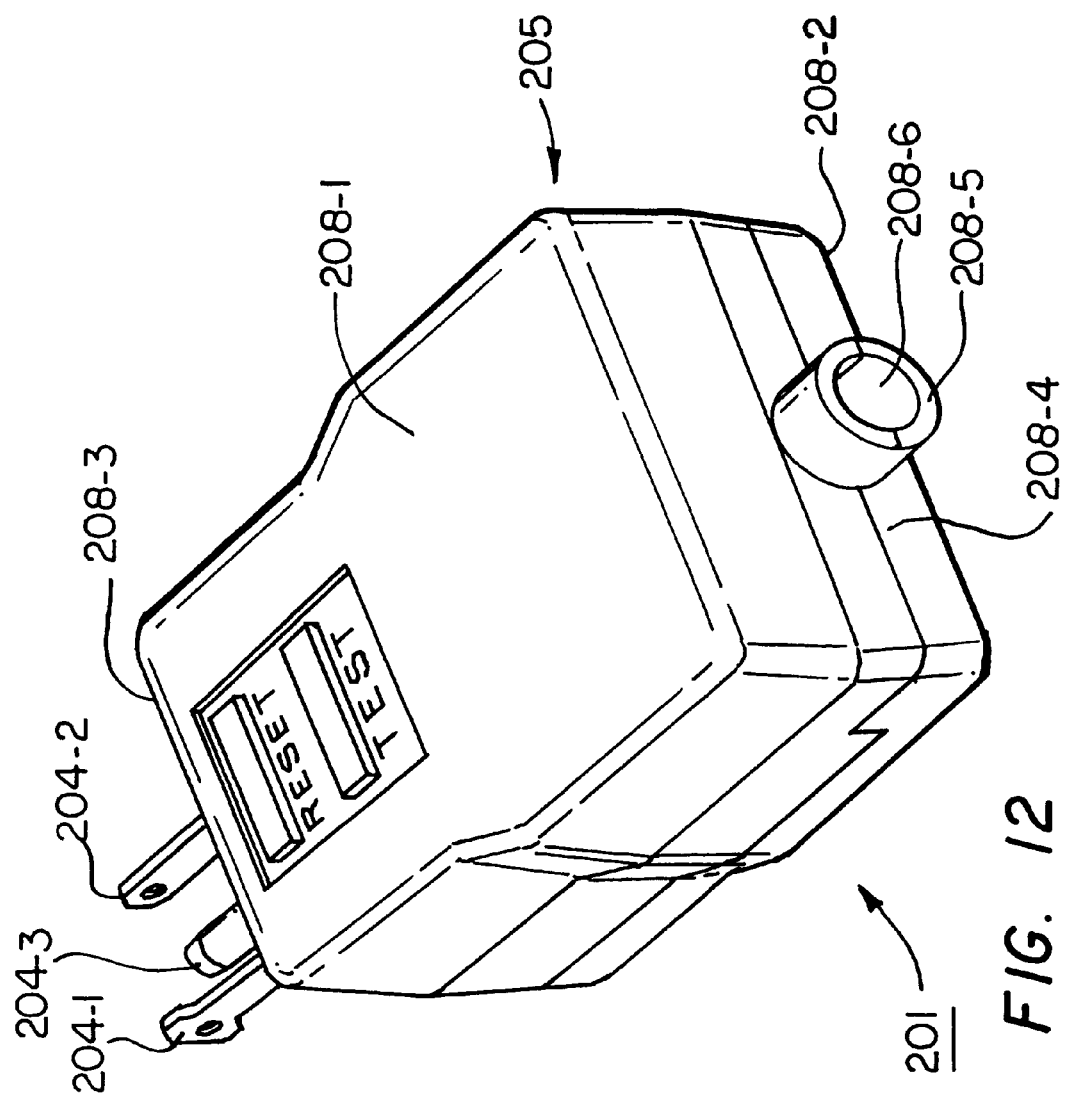
FIG. 12 is a perspective view of a third embodiment of a miniature appliance leakage current interrupter.
Figure 13:
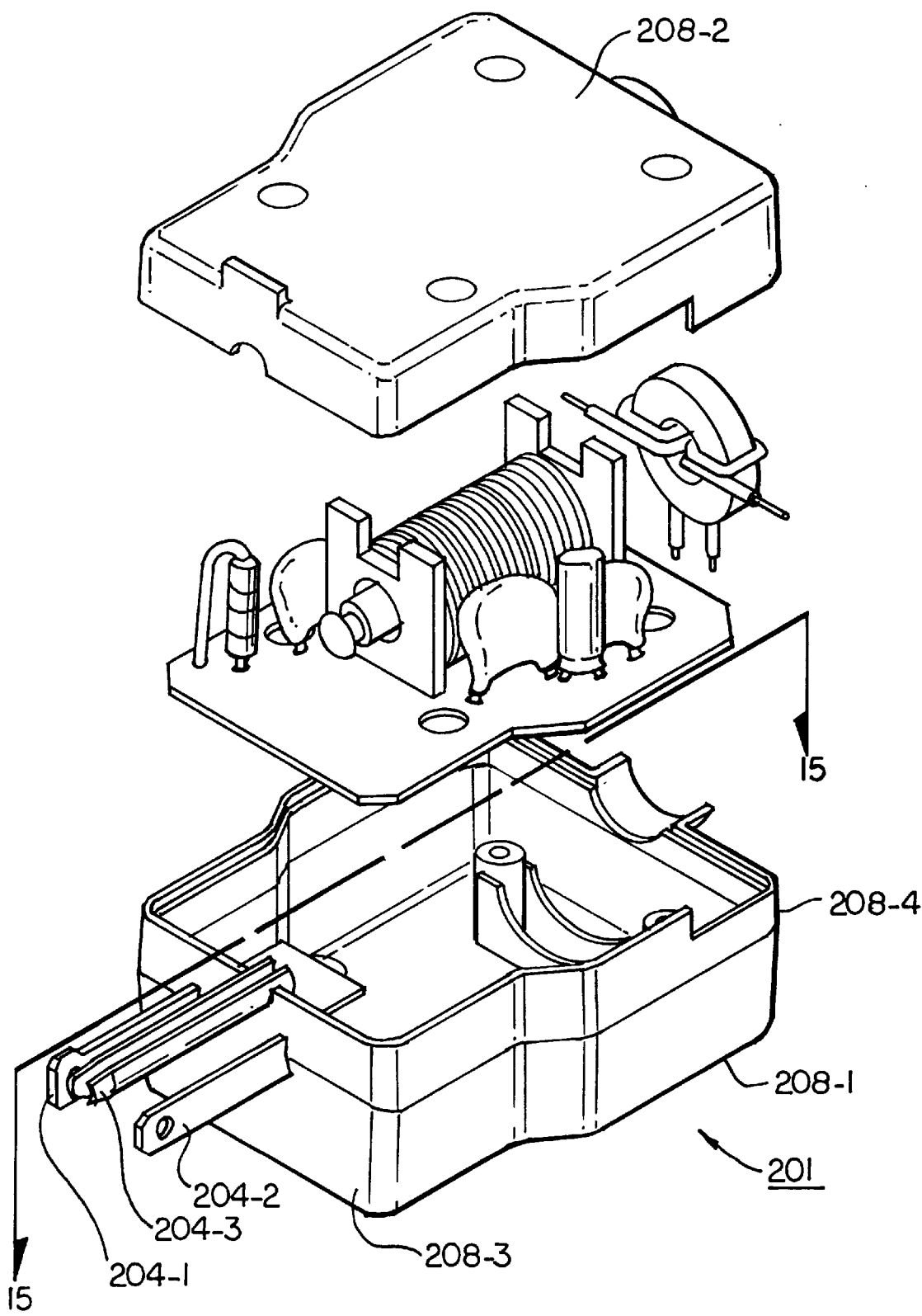
FIG. 13 is a bottom exploded view of the miniature appliance leakage current interrupter shown in FIG. 12.

Specifically, ALCI 201 comprises a rectangular-shaped housing 205 which is constructed so that it can be removably mounted onto an end of an electrical cord 207 which, in turn, is connected to the load, such as an electrical appliance. Housing 205 comprises a top 208-1, a bottom 208-2, a front end 208-3 and a rear end 208-4 having a neck 208-5 which is shaped to define a circular opening 208-6, as shown in FIG. 12.

ALCI 201 further includes a prong assembly 203 which comprises a neutral contact prong 204-1, a line contact prong 204-2 and a ground contact prong 204-3. Prongs 204 are sized and shaped so as to be fitted within the sockets of a three prong electrical outlet. Prongs 204 extend from within housing 205 and protrude out through front end 208-3 from housing 205 at an angle of 180 degrees relative to the longitudinal axis of electrical cord 207, as shown in FIG. 15, this particular orientation of prongs 204 in relation to housing 205 being commonly referred to as in line mounting or straight blade mounting in the art.

Figure 15:
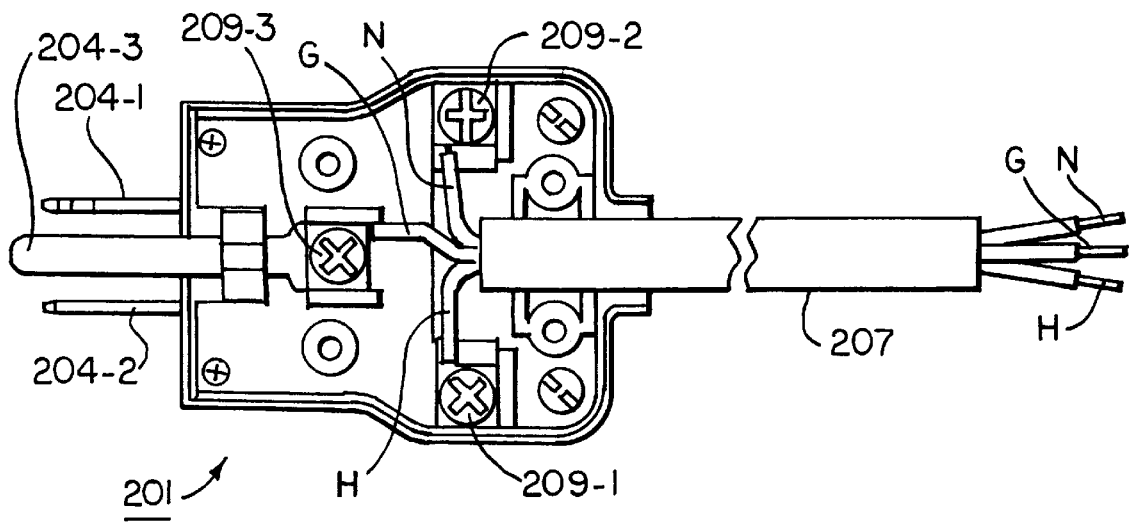
FIG. 15 is a bottom view of the miniature appliance leakage current interrupter shown in FIG. 13, taken along lines 15—15, the miniature appliance leakage current interrupter being shown with an electrical cord connected thereto.
Figure 16:
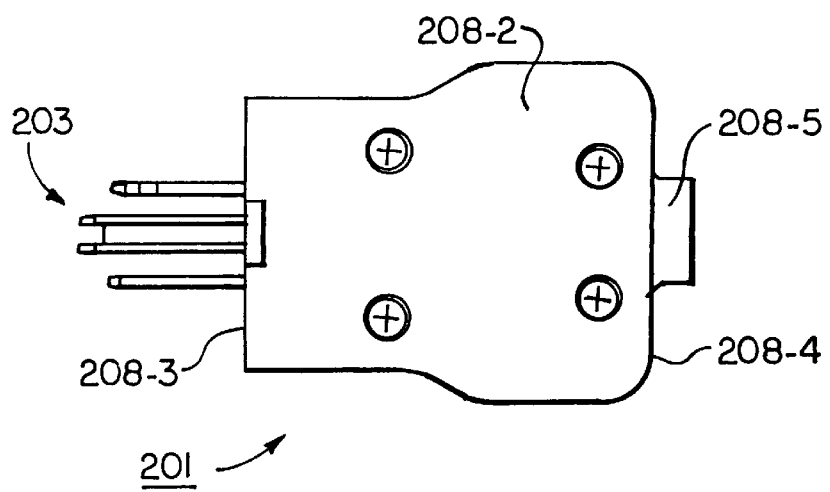
FIG. 16 is a bottom view of the miniature appliance leakage current interrupter shown in FIG. 12.

Housing 205 is constructed so that it can be removably mounted onto electrical cord 207 which comprises a hot line H, a neutral line N and a ground line G, as shown in FIG. 15. Hot line H is coupled to a first conductive contact arm (not shown), and accordingly to the circuitry for ALCI 201, by a screw 209-1. Neutral line N is coupled to a second conductive contact arm (not shown), and accordingly to the circuitry for ALCI 201, by a screw 209-2. Ground line G is connected to ground contact prong 204-3 by a screw 209-3. As can be appreciated, removably mounting housing 205 onto electrical cord 207 creates numerous advantages, such as the simplification of manufacturing ALCI 201, which is highly desirable.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An appliance leakage current interrupter (ALCI) for interrupting the flow of current through a pair of lines extending between a source of power and a load, said appliance leakage current interrupter comprising:
   (a). a housing comprising a top, a bottom, a front end and a rear end,
   (b). a prong assembly for supplying power from the source of power to the remainder of said appliance leakage current interrupter, said prong assembly comprising first and second contact prongs which are in line mounted on said housing.

2. The ALCI of claim 1 further comprising:
   (a). a circuit breaker having a pair of normally closed switches, one switch being located in each of the pair of lines extending between the source of power and the load,
   (b). a relay circuit for selectively opening the pair of normally closed switches,
   (c). a fault detection circuit for detecting the presence of a ground fault condition in the pair of lines extending between the source of power and the load and for causing said relay circuit to open said circuit breaker when said fault condition detected exceeds a predetermined value, said fault detection circuit comprising an integrated circuit chip and a transformer.

3. The ALCI of claim 2 wherein said first contact prong is a neutral contact prong and said second contact prong is a line contact prong.

4. The ALCI of claim 3 wherein the first and second contact prongs extend out the front end of said housing.

5. The ALCI of claim 4 wherein said housing is mounted on an end of an electrical cord connected to the load, the electrical cord having a longitudinal axis.

6. The ALCI of claim 5 wherein said prong assembly further comprises a pair of conductive bracket arms positioned within said housing, each bracket arm being in contact with an associated contact prong and a pair of conductive contact arms pivotally mounted within said housing, each contact arm capable of selective contact with an associated bracket arm, said contact arms being connected to the remainder of said appliance leakage current interrupter such that only when each contact arm is in contact with its associated bracket arm, power is supplied to said appliance leakage current interrupter.

7. An appliance leakage current interrupter (ALCI) for interrupting the flow of current through a pair of lines extending between a source of power and a load, said appliance leakage current interrupter comprising:
   (a). a housing comprising a top, a bottom, a front end and a rear end,
   (b). a prong assembly for supplying power from the source of power to the remainder of said appliance leakage current interrupter, said prong assembly comprising first, second and third contact prongs which are in line mounted on said housing.

8. The ALCI of claim 7 further comprising:
   (a). a circuit breaker having a pair of normally closed switches, one switch being located in each of the pair of lines extending between the source of power and the load,
   (b). a relay circuit for selectively opening the pair of normally closed switches, (c). a fault detection circuit for detecting the presence of a ground fault condition in the pair of lines extending between the source of power and the load and for causing said relay circuit to open said circuit breaker when said fault condition detected exceeds a predetermined value, said fault detection circuit comprising an integrated circuit chip and a transformer.

9. The ALCI of claim 8 wherein said first contact prong is a neutral contact prong, said second contact prong is a line contact prong and said third contact prong is a ground contact prong.

10. The ALCI of claim 9 wherein the first, second and third contact prongs extend out the front end of said housing.

11. The ALCI of claim 10 wherein said housing is constructed so that it can be removably mounted on an end of an electrical cord connected to the load, the electrical cord having a longitudinal axis.

* * * * *